(12) United States Patent
Harada et al.

(10) Patent No.: US 6,720,697 B2
(45) Date of Patent: Apr. 13, 2004

(54) DIRECT-CURRENT MOTOR

(75) Inventors: Hiroyuki Harada, Hamamatsu (JP); Takeshi Tanaka, Toyohashi (JP); Toshihiro Tanino, Hamamatsu (JP)

(73) Assignee: Asmo Co., Ltd., Shizuoka-ken (JP)

( * ) Notice: Subject to any disclaimer, the term of this patent is extended or adjusted under 35 U.S.C. 154(b) by 36 days.

(21) Appl. No.: 10/022,980

(22) Filed: Dec. 17, 2001

(65) Prior Publication Data

US 2002/0074886 A1 Jun. 20, 2002

(30) Foreign Application Priority Data

Dec. 18, 2000 (JP) ...................................... 2000-383959
Dec. 25, 2000 (JP) ...................................... 2000-392522

(51) Int. Cl.$^7$ .......................... H02K 23/04; H02K 1/17
(52) U.S. Cl. ................................ 310/154.28; 310/154.29
(58) Field of Search ...................... 310/154.22–154.29, 310/156.38–165.47, 179–180, 184, 185

(56) References Cited

U.S. PATENT DOCUMENTS

| | | | | |
|---|---|---|---|---|
| 4,110,718 A | * | 8/1978 | Odor et al. ................. 335/296 |
| 4,703,210 A | | 10/1987 | Abukawa et al. ........... 310/154 |
| 5,204,569 A | * | 4/1993 | Hino et al. ............. 310/154.28 |
| 5,677,587 A | * | 10/1997 | Sakashita et al. ...... 310/154.28 |
| 6,342,744 B1 | * | 1/2002 | Harada et al. ......... 310/154.12 |

FOREIGN PATENT DOCUMENTS

| | | | |
|---|---|---|---|
| DE | 41 09 729 A | 10/1992 | |
| DE | 198 32 157 A | 1/2000 | |
| GB | 2 037092 A | 7/1980 | |
| JP | 2001-095218 | 6/2001 | .......... H02K/23/04 |
| JP | 2001258228 | 9/2001 | |

OTHER PUBLICATIONS

Soviet Inventions Illustrated; Sec. El, Week 199736; Derwent Pub. Ltd. Jan. 27, 1997, Abstract, Fig. 1.

US Patent Applicant No. 09/536,401 filed Mar. 28, 2000. No copy is included in accordance with 37 CFR § 1.98 (a)(2)(iii).

* cited by examiner

*Primary Examiner*—Tran Nguyen
(74) *Attorney, Agent, or Firm*—Crompton, Seager & Tufte, LLC

(57) ABSTRACT

The armature of a direct-current motor is formed by an armature core and armature coils. The core includes teeth, which are arranged at a pitch of a predetermined angle. The coils are wound about every group of selected teeth of a predetermined number. Two magnets face each other with the armature in between. Each magnet includes main portion, an extended portion, which extends from the main portion, and a first weak flux part. The first weak flux part is located in the vicinity of the border of the extended portion and the main portion. The first weak flux part extends along one pitch of the teeth. The flux of the first weak flux part gradually increases along the rotation direction of the armature. The motor also includes a commutator, which has segments. The segments are connected to each coil. A pair of brushes can contact each segment. The brushes supply current to the coils through the segments. During commutation, each brush establishes a short circuit in an adjacent pair of the segments, thereby changing the direction of current flowing through the coil. When commutation is started, the advancing end of the first tooth in one of the teeth groups, the first tooth being located at the most advanced position in the group in the rotation direction of the armature, is aligned with the first weak flux part of one of the magnets.

14 Claims, 11 Drawing Sheets

Fig. 14

| Tooth Group Number | A | B | C | D | E | F | G | H | I | J | K | L | A | B | C | D |
|---|---|---|---|---|---|---|---|---|---|---|---|---|---|---|---|---|
| 1 | X | X | X | X | X |   |   |   |   |   |   |   |   |   |   |   |
| 2 |   | X | X | X | X | X |   |   |   |   |   |   |   |   |   |   |
| 3 |   |   | X | X | X | X | X |   |   |   |   |   |   |   |   |   |
| 4 |   |   |   | X | X | X | X | X |   |   |   |   |   |   |   |   |
| 5 |   |   |   |   | X | X | X | X | X |   |   |   |   |   |   |   |
| 6 |   |   |   |   |   | X | X | X | X | X |   |   |   |   |   |   |
| 7 |   |   |   |   |   |   | X | X | X | X | X |   |   |   |   |   |
| 8 |   |   |   |   |   |   |   | X | X | X | X | X |   |   |   |   |
| 9 |   |   |   |   |   |   |   |   | X | X | X | X | X |   |   |   |
| 10 |   |   |   |   |   |   |   |   |   | X | X | X | X | X |   |   |
| 11 |   |   |   |   |   |   |   |   |   |   | X | X | X | X | X |   |
| 12 |   |   |   |   |   |   |   |   |   |   |   | X | X | X | X | X |

Tooth Number

DIRECT-CURRENT MOTOR

BACKGROUND OF THE INVENTION

The present invention relates to a direct-current motor.

In a typical direct-current motor, which has brushes and commutators, the brushes and a commutator change the direction of current supplied to coils, or commutate the current. However, in many cases, in the last stage of switching, the direction of the current is abruptly changed, that is, under commutation occurs. Undercommutation causes the brushes to discharge sparks, which produce noise and wears the brushes.

To prevent undercommutation, commutation is improved by displacing the position of each brush in a direction opposite to the rotation direction of the rotor relative to the circumferential center of the corresponding magnet.

However, the proper position of each brush varies according to the rotation speed of the motor and the current through the coil. Therefore, when the rotation speed and the coil current change due to a change of load acting on the motor, it is difficult to commutate current appropriately. A radical countermeasure has therefore been wanted.

Part of each magnet in a typical direct-current motor is designed to function as a flux changer. The position of the corresponding brush relative to the flux changer influences commutation. If the relative position is inappropriate, occurrence of sparks will be frequent, which prevents improved commutation. Further, the flux changer changes the attraction force generated between the magnet and the armature. Therefore, the rotational force generated when rotating the armature without supplying current to the motor, or the racing torque (cogging torque), is increased. This produces noise and vibration.

SUMMARY OF THE INVENTION

Accordingly, it is a first objective of the present invention to provide a direct-current motor that prevents sparks from occurring by locating each brush at an appropriate position relative to the corresponding magnet that has a magnetic flux changer (weak flux part).

A second objective of the present invention is to provide a direct-current motor that reduces cogging torque, thereby operating smoothly with low noise.

To achieve the foregoing and other objectives and in accordance with the purpose of the present invention, a direct-current motor is provided. The motor includes an armature core, a plurality of armature coils, a plurality of magnets, a commutator, and a pair of brushes. The core has a plurality of teeth. The teeth are arranged at a pitch of a first predetermined angle. Each coil is wound about a different group of teeth having a predetermined number of teeth. Each tooth is located at the most advancing position in the rotation direction in one of the teeth groups. The armature core and the armature coils form an armature. The magnets face one another with the armature in between. Each magnet includes a main portion, an extended portion, a first weak flux part. The extended portion extends from the main portion. The first weak flux part is located in the vicinity of the border of the extended portion and the main portion. The first weak flux part extends along one pitch of the teeth, and the flux of the first weak flux part gradually increases along the rotation direction of the armature. The commutator has a plurality of segments. The segments are connected to each coil. The brushes can contact each segment. The brushes supply current to the coils through the segments. During commutation, each brush establishes a short circuit in an adjacent pair of the commutator segments, thereby changing the direction of current flowing through the coil. When commutation is started for a group of teeth, the advancing end of the first tooth in that teeth group, the first tooth being located at the most advanced position in the group in the rotation direction of the armature, is aligned with the first weak flux part of one of the magnets.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 14 is a table illustrating an arrangement of the teeth into ensuing teeth groups in a preferred embodiment.

DETAILED DESCRIPTION OF THE PREFERRED EMBODIMENTS

Figure 1:
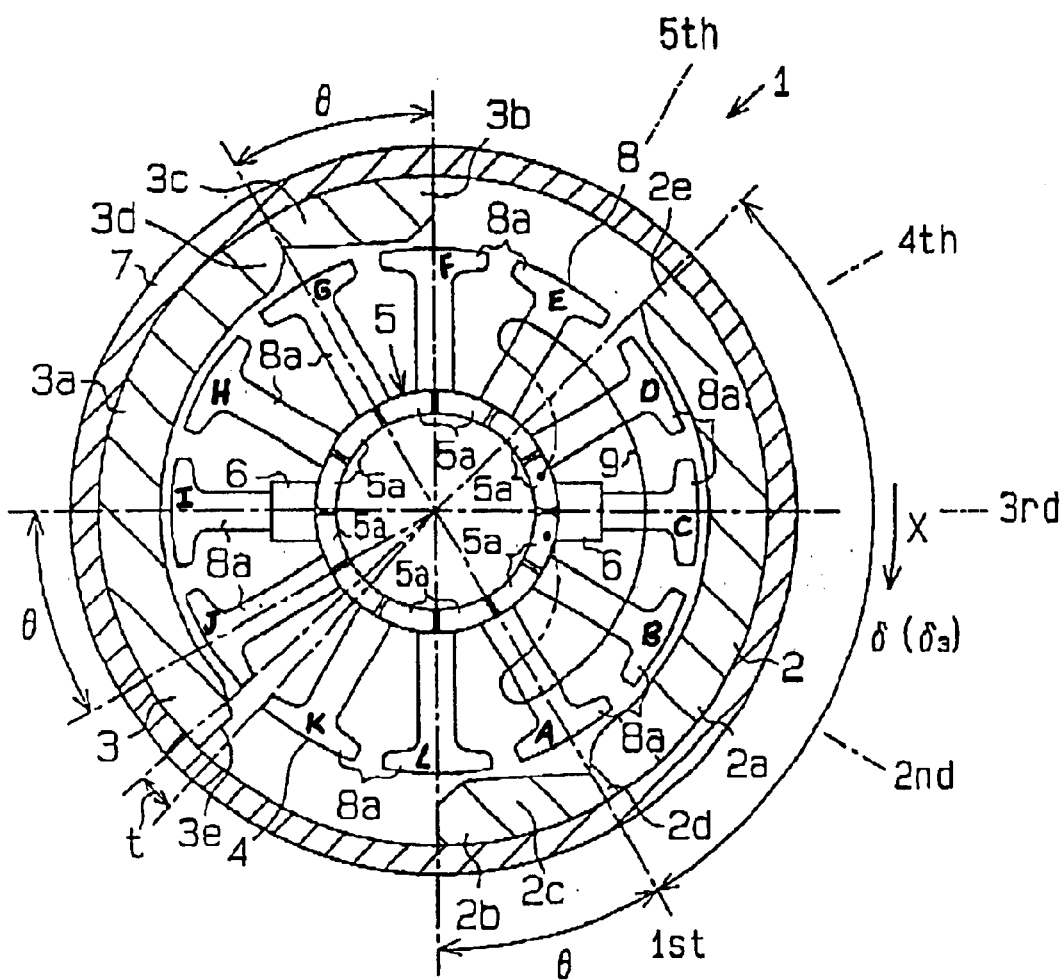
FIG. 1 is a partial cross-sectional view illustrating a direct-current motor according to a first embodiment of the present invention.
Figure 2:
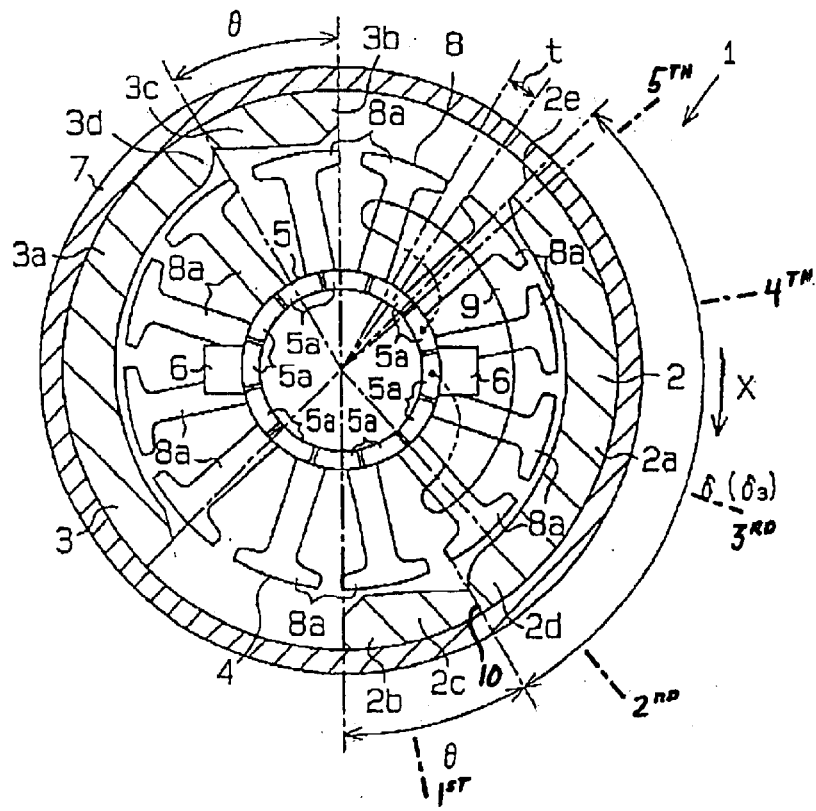
FIG. 2 is a partial cross-sectional view illustrating the direct-current motor of FIG. 1, when commutation is started.

A direct-current motor according to a first embodiment of the present invention will now be described with reference to the drawings. In this embodiment, the direct-current motor is a blower motor 1. FIG. 1 is a partial cross-sectional view illustrating the blower motor 1. FIG. 2 is a partial cross-sectional view illustrating the blower motor 1, when commutation is started.

As shown in FIGS. 1 and 2, the blower motor 1 includes two magnets 2, 3, an armature 4 and commutators 5, and a pair of brushes 6.

Specifically, the blower motor 1 is a bipolar direct-current motor and has a motor housing yoke 7. The magnets 2, 3, which form a north pole and a south pole, face each other with the armature 4 in between. The magnets 2, 3 are symmetrical with respect to the center of the armature 4. Therefore, for purposes of illustration, the structure related to the magnet 2 will be described. The armature 4 includes a core 8 and coils 9 wound about the core 8. To rotate the armature 4, current is supplied to the coils 9.

The armature core 8 has teeth 8a, the number of which is twelve in this embodiment. Also, the number of the coils 9 is twelve in this embodiment. Each tooth 8a (i.e. A,B,C,D,E,F,G,H,I,J,K,L) has a bar at the distal end. The tooth bars extend in the circumferential direction. In this embodiment, each consecutive five teeth 8a form a group (Group No. 1 [A,B,C,D,E,]), and there are twelve groups of the teeth 8a as shown in FIG. 14. Specifically, any one of the teeth 8a (tooth A) is located at the most forwarding position in the rotation direction in one of the teeth groups (Group No. 1), and the tooth 8a at the second most forwarding position in this group (tooth B) is also the most forwarding tooth 8a in the next group (Group No. 2 [B,C,D,E,F]). In this manner, each tooth 8a is defined as the most forwarding tooth to the most trailing tooth 8a, or the first to fifth tooth 8a, in five consecutive teeth groups. Each group comprises five teeth including the first to fifth tooth. The first tooth is the most forwarding tooth and the fifth tooth is the most trailing tooth. Each coil 9 is wound about one of the teeth groups. Only one of the coils 9 is shown in FIG. 1.

The teeth 8a are spaced apart by thirty-degree intervals. Therefore, the angle defined by each adjacent pair of the teeth 8a, or the pitch of the teeth 8a, is 30°. In other words, the armature slot angle θ is 30° (30°=360°/12). This winding structure is referred to as distributed winding.

The commutator 5 is located at one side of the armature 4 and includes twelve segments 5a. Each segment 5a forms a pair with the adjacent segment 5a, and there are twelve pairs of the segments 5a. The segments 5a in one of the pairs are connected to the terminals of the corresponding coil 9, respectively. The brushes 6, which face each other, are urged to contact the commutator 5. A direct-current power supply (not shown) supplies direct current to the brushes 6. The current flows to the coils 9 through the brushes 6 and the commutator segments 5a, which starts rotation of the armature 4. When a pair of adjacent segments 5a contacts one of the brushes 6, a short circuit is established between these segments 5a, which changes the flowing direction of current in the coils 9. Therefore, the armature 4 continues rotating clockwise, or a direction of arrow X in the drawing. Since the segments 5a are spaced apart by thirty-degree intervals, the current direction through each coil 9 is changed in a thirty-degree rotation of the armature 4 relative to the brushes 6. That is, commutation of the coils 9 is performed in a thirty-degree rotation of the armature 4. In this embodiment, the angle between each adjacent pair of the segments 5a is equal to the angle θ between each adjacent pair of the teeth 8a. The angle that corresponds to the contacting width between each brush 6 and the segments 5a is equal to the angle θ.

The magnet 2 (3) has a main portion 2a (3a) and an extended portion 2b (3b). The extended portion 2b extends in the advancing direction, or forward from the main portion 2a with respect to the rotating direction of the armature 4.

As shown in FIG. 1, the circumferential length of the main portion 2a corresponds to an angle δ, the relation of which with the angle θ is represented by the following equation.

$$\delta = \theta \times (n - 1 - (\tfrac{1}{2}))$$

the sign n represents the number of the teeth 8a in one teeth group, about which one of the coils 9 is wound.

Therefore, in this embodiment, the angle δ of the main portion 2a is represented by the following equation.

$$\delta = 30° \times (5 - 1 - (\tfrac{1}{2})) = 105°.$$

The circumferential length of the main portion 2a is determined to correspond to this angle. When the circumferential center of the first tooth 8a in each teeth group is aligned with the most forwarding end 2d of the main portion 2a in the rotation direction of the armature 4 as shown in FIG. 1, the most trailing end 2e of the main portion 2a is aligned with the circumferential midpoint between the fifth tooth 8a and the fourth tooth 8a in the teeth group.

The circumferential length of the extended portion 2b corresponds to the slot angle θ, or the angle that corresponds to the commutation section (the commutation section angle). The radial dimension, which is referred to as thickness in this embodiment, of the extended portion 2b gradually increases in the circumferential direction. The extended portion 2b (3b) has a thin part 2c (3c). That is, the magnet 2 has a first weak flux part, which is the thin part 2c between the main portion 2a and the extended portion 2b. In this embodiment, the thin part 2c is formed in the extended portion 2b. The magnet 2 has the minimum magnetic flux density at the border between the extended portion 2b and the main portion 2a. The magnetic flux density varies along the thin part 2c of the extended portion 2b.

The relationship between the teeth 8a and the magnet 2 (3) during commutation will now be described with reference to FIG. 2.

As shown in FIG. 2, when the forwarding end of the bar of the first tooth 8a is aligned with the border 10 of the thin part 2c and the main portion 2a during rotation of the armature 4, one of the brushes 6, which is connected to one of the pairs of the segments 5a, starts contacting the adjacent segment 5a. The connecting point of the segment 5a and the coil 9 is indicated by a dot in FIG. 1. This starts commutation of the corresponding coil 9. In other words, the bar of the first tooth 8a starts approaching the thin part 2c at the moment when commutation of the brush 6 is started.

When the armature 4 rotates by a certain angle from the state of FIG. 2 and reaches the state of FIG. 1, and one of the pairs of the segments 5a contacts one of the brushes 6 in the substantially same areas, the flowing direction of current through the coil 9 is changed. At this time, the most forwarding end 2d of the main portion 2a is aligned with the circumferential center of the first tooth 8a, and the most trailing end 2e is aligned with the circumferential midpoint between the fifth tooth 8a and the fourth tooth 8a. When the armature 4 further rotates by a certain angle from the state of FIG. 1, commutation is suspended. The section angle of commutation is therefore thirty-degree angle.

A part of the extended portion 2b that faces the core 8, or the thin part 2c, gradually increases the thickness, in the commutation section angle. Therefore, the amount of magnetic flux passing through each coil 9 during commutation gradually increases as the armature 4 rotates. The rate of increase of the flux amount also gradually increases. Since the amount of flux through the coil 9 changes, the voltage induced in the coil 9 is small at first and is gradually increased negatively. The induced voltage cancels the reactance voltage. This decreases undercommutation.

Figure 3:
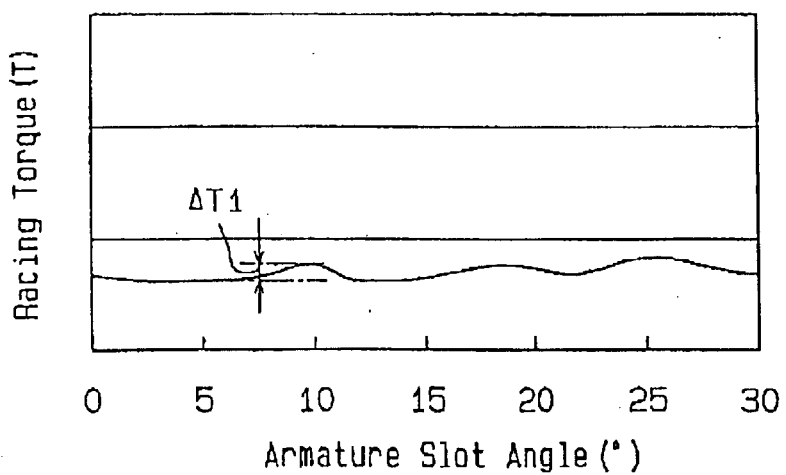
FIG. 3 is a graph showing the racing torque of the direct-current motor shown in FIG. 1.

FIG. 3 shows a change (cogging torque $\Delta T1$) of the racing torque T when the armature 4 rotates by one slot (thirty degree) from the position at which commutation of one of the coils 9 is started. In this embodiment, when commutation of one of the coils 9 is started, the most trailing end 2e of the main portion 2a is located at the circumferential midpoint of the fifth tooth 8a and the fourth tooth 8a. Therefore, the cogging torque $\Delta T1$ is reduced, as shown in FIG. 3. The cogging torque $\Delta T1$ is smaller than that of the prior art by 83%.

As described above, this embodiment has the following advantages.

(1) At the beginning of commutation, the distal end of the first toothe 8a is aligned with the first weak flux part (thin part 2c). In other words, the positions of the brushes 6 are determined such that each brush 6 forms a short circuit in one of the pairs of the segments 5a when the forwarding end of the bar of the first tooth 8a is aligned with the first weak flux part 2c.

Therefore, the positions of the brushes 6 are appropriate relative to the magnet 2, which include the first weak flux part 2c. This permits commutation to be reliably performed and prevents sparks.

(2) The circumferential length of the main portion 2a corresponds to the angle $\delta(\delta=105°)$ so that the most trailing end 2e of the main portion 2a is aligned with the circumferential midpoint of the fifth tooth 8a and the fourth tooth 8a when the first tooth 8a is aligned with the most advancing end 2d of the main portion 2a.

When commutation of each coil 9 is started, the most trailing end 2e of the main portion 2a is most spaced apart from the circumferential center of the fifth tooth 8a. Thus, compared to the prior art, the cogging torque $\Delta T1$ of the blower motor 1 is significantly decreased. As a result, the blower motor 1 operates smoothly with low noise.

(3) The cogging torque $\Delta T1$ is decreased by simply changing the circumferential length of the main portion 2a (3a) of the magnet 2 (3), which simplifies the manufacture and reduces the cost.

(4) The angle between each adjacent pair of the segments 5a is equal to the slot angle $\theta$, which is the angle defined by any one of adjacent pair of the teeth 8a. Also, the angle corresponding to the contacting width between each brush 6 and each pair of the segments 5a is equal to the slot angle $\theta$.

Therefore, when commutation is started, the forwarding end of the bar of the first tooth 8a is reliably aligned with the border of the thin part 2c (3c) and the main portion 2a (3a) of the magnet 2 (3). In other words, when the forwarding end of the bar of the first tooth 8a is aligned with the border of the thin part 2c (3c) and the main portion 2a (3a) of the magnet 2 (3), commutation is reliably started.

Figure 4:
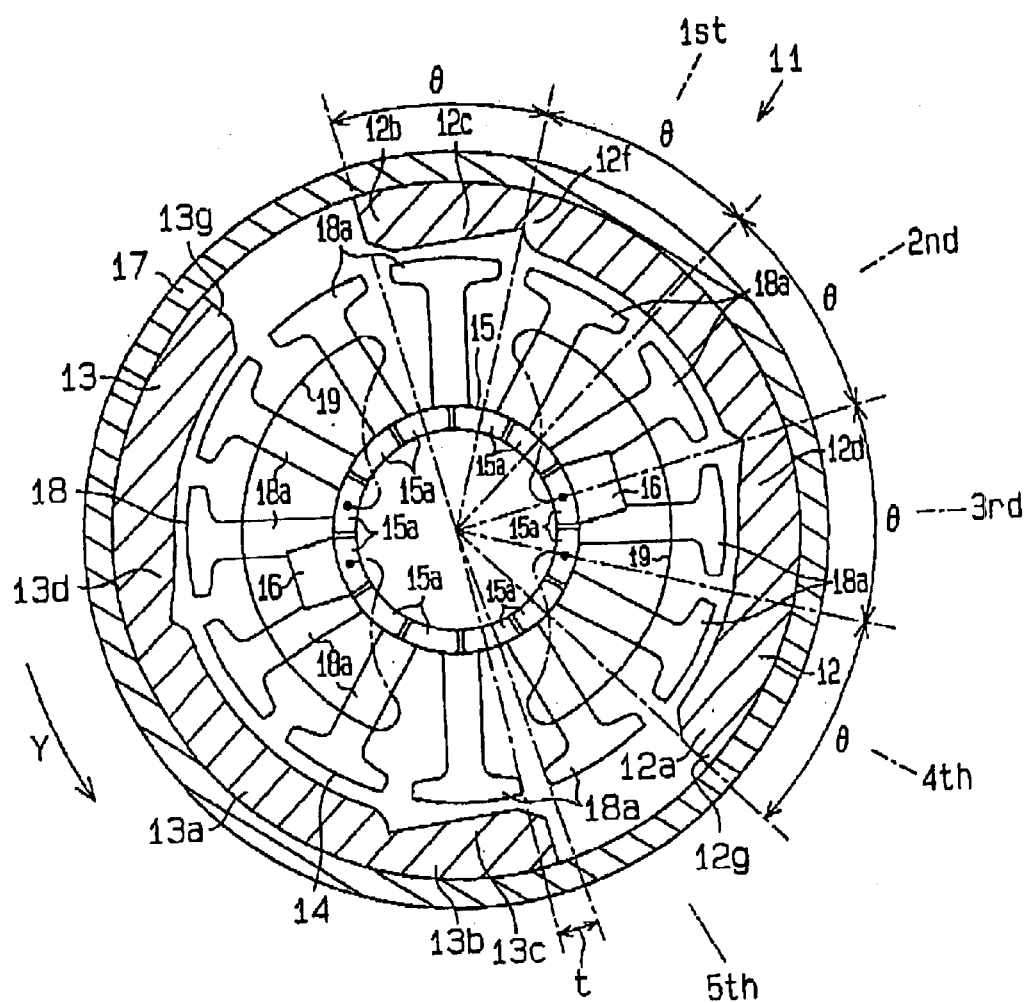
FIG. 4 is a partial cross-sectional view illustrating a direct-current motor according to a second embodiment of the present invention.
Figure 5:
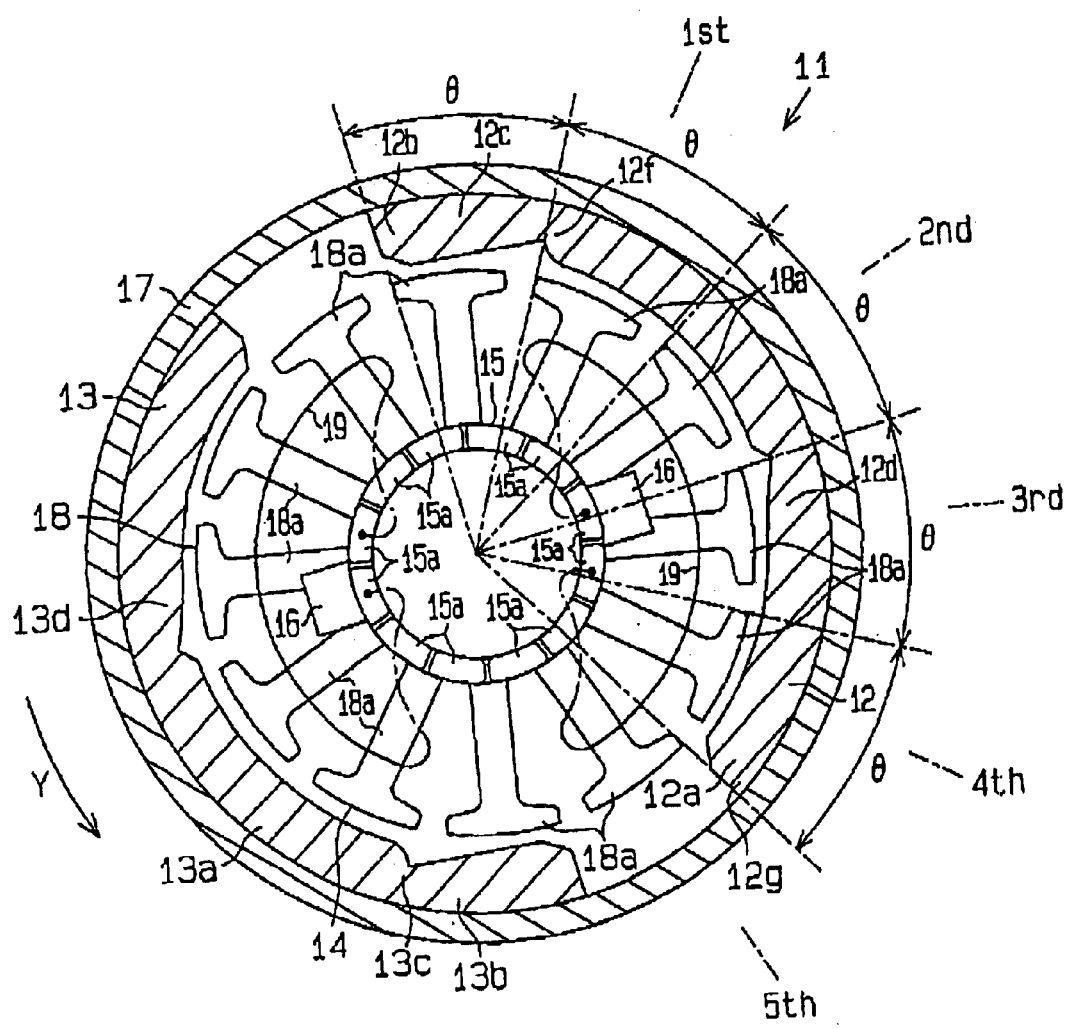
FIG. 5 is a partial cross-sectional view illustrating the direct-current motor of FIG. 4, when commutation is started.

A direct-current motor according to a second embodiment of the present invention will now be described with reference to the drawings. In this embodiment, the direct-current motor is a blower motor 11. FIG. 4 is a partial cross-sectional view illustrating the blower motor 11. FIG. 5 is a partial cross-sectional view illustrating the blower motor 11, when commutation is started.

As shown in FIGS. 4 and 5, the blower motor 11 includes two magnets 12, 13, an armature 14 and commutators 15, and a pair of brushes 16.

The blower motor 11 is a bipolar direct-current motor and has a motor housing yoke 17. The magnets 12, 13, which form a north pole and a south pole, face each other with the armature 14 in between. The magnets 12, 13 are symmetrical with respect to the center of the armature 14. Therefore, for purposes of illustration, the structure related to the magnet 12 will be described. The armature 14 includes a core 18 and coils 19 wound about the core 18. To rotate the armature 14, current is supplied to the coils 19. The armature core 18 has teeth 18a, the number of which is twelve in this embodiment. Also, the number of the coils 19 is twelve in this embodiment. Each tooth 18a has a bar at the distal end. The tooth bars extend in the circumferential direction. In this embodiment, each consecutive five teeth 18 a form a group, and there are twelve groups of the teeth 18a as shown in FIG. 14. Specifically, any one of the teeth 18a is located at the most forwarding position in the rotation direction in one of the teeth groups, and the tooth 18a at the second most forwarding position in this group is also the most forwarding tooth 18a in the next group. In this manner, each tooth 18a is defined as the most forwarding tooth to the most trailing tooth 18a, or the first to fifth tooth 18a, in five consecutive teeth groups. Each group comprises five teeth including the first to fifth tooth. The first tooth is the most forwarding tooth and the fifth tooth is the most trailing tooth. Each coil 19 is wound about one of the teeth groups. Only two of the coils 19 are shown in FIG. 4.

The twelve teeth 18a are spaced apart by thirty-degree intervals. Therefore, the pitch of the teeth 18a, or the armature slot angle $\theta$, is 30° (30°=36°/12). This winding structure is referred to as distributed winding.

The commutator 15 is located at one side of the armature 14 and includes twelve segments 15a. Each segment 15a forms a pair with the adjacent segment 15a, and there are twelve pairs of the segments 15a. The segments 15a in one of the pairs are connected to the terminals of the corresponding coil 9, respectively. The brushes 16 are urged to contact the commutator 15. A direct-current power supply (not shown) supplies direct current to the brushes 16. The current flows to the coils 19 through the brushes 16 and the commutator segments 15a, which starts rotation of the armature 14. When a pair of adjacent segments 15a contacts one of the brushes 16, a short circuit is established between these segments 15a, which changes the flowing direction of current in the coils 19. Therefore, the armature 14 continues rotating counterclockwise, or a direction of arrow Y in the drawing. Since the twelve segments 15a are spaced apart by thirty-degree intervals, the current direction through each coil 19 is changed in a thirty-degree rotation of the armature 14 relative to the brushes 16. That is, commutation of the coils 19 is performed in a thirty-degree rotation of the armature 14. In this embodiment, the angle between each adjacent pair of the segments 15a is equal to the angle $\theta$ between each adjacent pair of the teeth 18a. The angle that corresponds to the contacting width between each brush 16 and the segments 15a is equal to the angle $\theta$.

The magnet 12 (13) has a main portion 12a (13a) and an extended portion 12b (13b). The extended portion 12b extends in the advancing direction, or forward from the main portion 12a with respect to the rotating direction of the armature 14.

As shown in FIG. 4, the circumferential length of the main portion 12a, 13a corresponds to the slot angle $\theta$ multiplied by an integer. In this embodiment, length of the main portion 12a (13a) corresponds to 120° (40$\theta$).

When the circumferential center of the first teeth 18a is aligned with the most forwarding end 12f of the main portion 12a, the most trailing end 12g is aligned with the circumferential center of the fifth tooth 18a.

Referring to FIG. 4, when the circumferential midpoint of the first tooth 18a and the tooth 18a that is located at the forwarding side of the first tooth 18a is aligned with the border of the most forwarding portion 12f and the extended portion 12b, the most trailing end 12g of the main portion 12a is aligned with the circumferential midpoint between the fifth tooth 18a and the tooth 18a.

As shown in FIG. 4, the circumferential length of the extended portion 12b corresponds to the slot angle (the angle of the commutation) $\theta(30°)$. The thickness of the extended portion 12b gradually increases along the rotation direction. That is, the magnet 12 (13) has a first weak flux part, which is a first thin part 12c (13c), between the main portion 12a (13a) and the extended portion 12b (13b). In this embodiment, the first thin part 12c (13c) is formed in the extended portion 12b (13b).

A second weak flux part, which is a second thin part 12d, is formed at a location that is away from the most forwarding portion 12f by an angle that is equal to the slot angle $\theta$ multiplied by an integer number m, or an angle m$\theta$. In this embodiment, the second thin part 12d is away from the angle $2\theta(60°)$ from the most forwarding portion 12f in the clockwise direction. The second thin part 12d extends in a range of 30°. When the circumferential midpoint between the first tooth 18a and the tooth 18a that is at the forwarding side of the first tooth 18a is aligned with the border of the first thin part 12c and the main portion 12a the second thin part 12 d is aligned with the third tooth 18a.

The second thin part 12d and the first thin part 12c are symmetrical with respect to the rotation direction of the armature 14. In other words, the thickness of the second thin part 12d changes in the opposite manner from the thickness of the first thin part 12c with respect to the rotation direction of the armature 14. Specifically, while the first thin part 12c increases its thickness along the rotation direction of the armature 14 and the flux gradually increases, the second thin part 12d decreases its thickness along the rotation direction of the armature 14 (the flux gradually decreases).

The first thin part 12c and the second thin part 12d are formed by machining the border of the main portion 12a and the extended portion 12b or by machining only the main portion 12a. The volume of the material removed for forming the second thin part 12d is equal to the volume of the material removed for forming the first thin part 12c.

The relationship between the teeth 18a and the magnets 12, 13 will now be described with reference to FIG. 5.

When the forwarding end of the bar of the first tooth 8a is aligned with the border of the first thin part 12c and the main portion 12a during rotation of the armature 14 as shown in FIG. 5, one of the brushes 16, which is connected to one of the pairs of the segments 15a, starts contacting the adjacent segment 15a. This starts commutation of the coil 19. In other words, the bar of the first tooth 18a starts approaching the first thin part 12c of the magnet 12 at the moment when commutation of the brush 16 is started. At this time, the forwarding end of the bar of the third tooth 18a is aligned with the second thin part 12d of the magnet 12.

When the armature 14 rotates counterclockwise from the state of FIG. 5, the flowing direction of current through the coils 19 is changed. That is, commutation is performed During commutation, the thickness of the extended portion 12b that faces one of the teeth 18a, or the thickness of the first thin part 12c, gradually increases in the commutation section angle of 30°. Therefore, the amount of magnetic flux passing through the coils 19 during commutation gradually increases as the armature 14 rotates. The rate of increase of the flux amount also gradually increases. Since the amount of flux through each coil 19 changes, the voltage induced in the coil 19 is small at first and is gradually increased negatively. The induced voltage cancels the reactance voltage. This decreases undercommutation.

Figure 6:
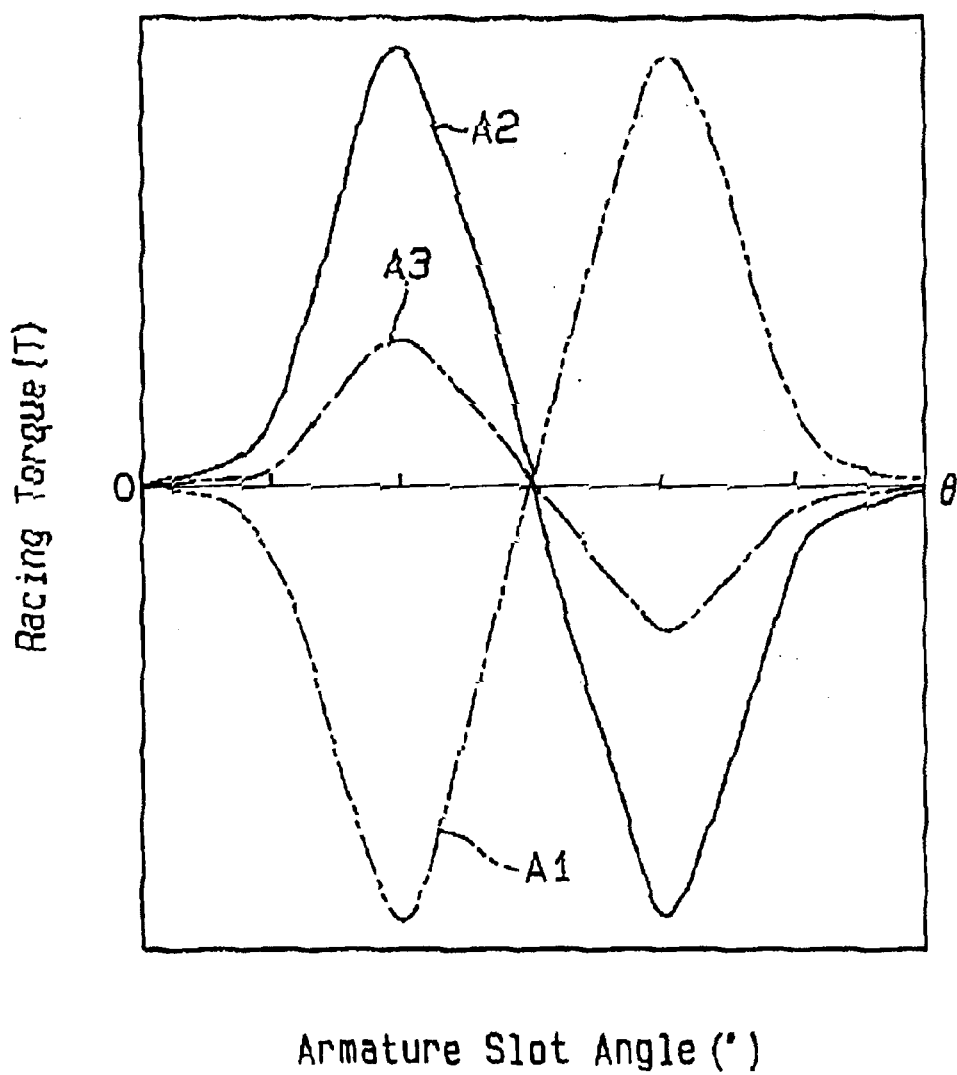
FIG. 6 is a graph showing the racing torque of the direct-current motor shown in FIG. 4.

FIG. 6 shows a change (cogging torque) of the racing torque T when the armature 14 rotates by one slot, or by the angle $\theta$, from the position at which commutation of one of the coils 19 is started, or from the 0° position. The change of the racing torque T caused by the first thin part 12c is represented by a two-dot chain line A1, and the change of the racing torque T caused by the second thin part 12d is represented by a single-dot chain line A2. Since commutation is performed within the angle $\theta(\theta=30°)$ of the motor rotation and the second thin part 12d is away from the first thin part 12c by the angle m$\theta$ (m is an integer), the period of the racing torque T represented by lines A1 and A2 corresponds to the angle $\theta(\theta=30°)$. Since the second thin part 12d and the first thin part 12c are symmetrical with respect to the rotation direction of the motor, the racing torque T represented by a solid line A2 and the two-dot chain line A1 are sine curves having the opposite changing patterns. The change (cogging torque) of the racing torque T caused by the first thin part 12c and the change (cogging torque) of the racing torque T caused by the second thin part 12d cancel each other. Accordingly, the cogging torque acting on the motor 11 is substantially eliminated.

The second embodiment has the following advantages.

(1) The main portion 12a, 13a includes the first thin part 12c, 13c and the second thin part 12d, 13d, which is spaced from the first thin part 12c, 13c by the angle me (m=2). The thickness of the second thin part 12d, 13d changes in the opposite manner from the thickness of the first thin part 12c, 13c.

Therefore, during commutation of the one of the coils 19, the cogging torque generated by the first thin part 12c, is canceled by the cogging torque generated by the second thin part 12d. As a result, the total cogging torque of the motor 11 is reduced. Thus, the blower motor 11 operates smoothly with reduced noise.

(2) The volume of material removed from the main portion 12a (13a) for forming the second thin part 12d (13d) is equal to the volume of material removed from the main portion 2a (13a) for forming the first thin part 12c (13c). Therefore, the cogging torque generated by the first thin part 12c (13c) is substantially equal to the cogging torque generated by the second thin part 12d (13d). This structure reduces the total cogging torque of the motor 11 substantially to zero. As a result, the motor 11 operates smoothly with low noise.

(3) The total cogging torque of the motor 11 is effectively reduced by simply forming the second thin parts 12d, 13d in the main portions 12a, 13a of the magnets 12, 13. Therefore, the manufacture of the motor 11 is facilitated and the cost is reduced.

(4) The magnets 12, 13 are symmetrical with respect to the axis of the armature 14. Therefore, magnetic flux is generated in a well balanced manner.

As described above, the first thin part 12c (13c) is spaced from the second thin part 12d (13d) by the angle m$\theta$. The angle me is referred to as an angle by which the smallest flux point of the second thin part 12d (13d) is spaced from the smallest flux point of the first thin part 12c (13c) (the border between the main portion 12a (13a) and the extended portion 12b (13b)).

The embodiments of FIGS. 1 to 6 may be modified as follows.

Figure 7:
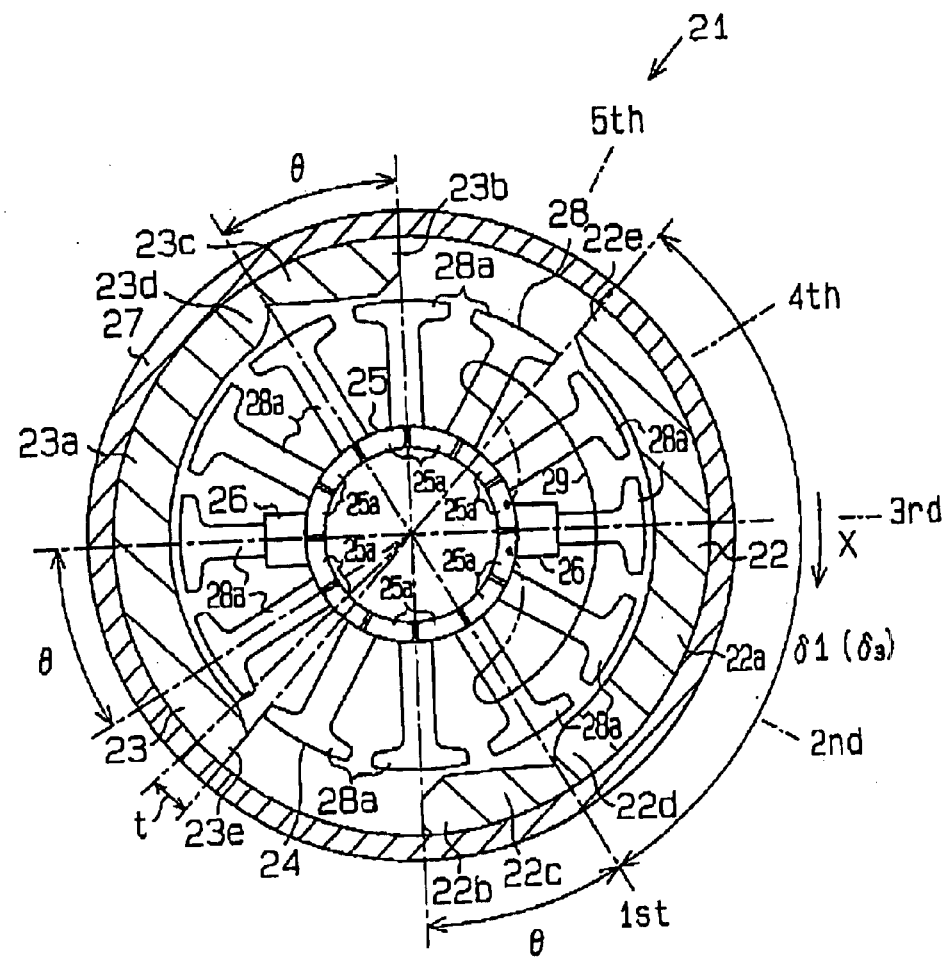
FIG. 7 is a partial cross-sectional view illustrating a direct-current motor according to a first modification of the direct-current motor shown in FIG. 1.

The motor of the embodiment of FIGS. 1 to 3 may be modified in a first modification as illustrated in FIG. 7. In the embodiment of FIG. 7, the length of the main portion 22a (23a) of magnet 22 (23) corresponds to a predetermined angle δ1. The angle δ1 is determined such that the most trailing end 22e (23e) of the main portion 22a (23a) is aligned with the forwarding end of the bar of the fifth tooth 28a when the circumferential center of the first tooth 28a faces the most forwarding portion 22d (23d) of the main portion 22a (23a). The angle δ1 represented by the following equations with the angle θ.

$$\delta1=\theta\times(n-1-(\tfrac{1}{2})+t/2 = 30°33(5-1-(\tfrac{1}{2}))+t/2 =105°t/2$$

In the equations, the sign n represents the number of the bars of teeth in a teeth group, and the sign t represents an angle that corresponds to the distance between the trailing end of the bar of a tooth 28a and the forwarding end of the bar of the adjacent tooth 28a. In this embodiment, when commutation of one of the coils 29 is started, the most trailing end 22e (23e) of the main portion 22a (23a) is relatively away from the circumferential center of the fifth tooth 28a. This reduces the cogging torque of the motor 21. Accordingly, the motor 21 operates smoothly with low noise.

Figure 8:
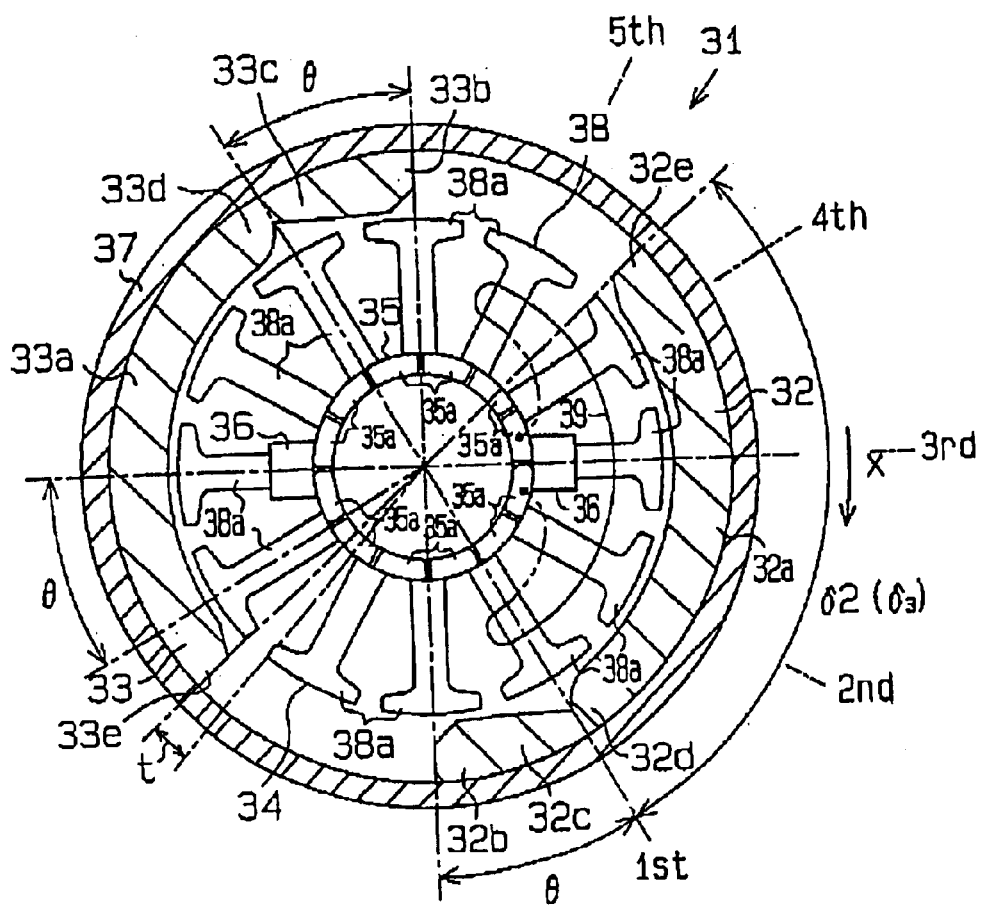
FIG. 8 is a partial cross-sectional view illustrating a direct-current motor according to an alternative modification of the direct-current motor shown in FIG. 1.

The motor of the embodiment of FIGS. 1 to 3 may be modified in a second modification as illustrated in FIG. 8. In the embodiment of FIG. 8, the length of the main portion 32a (33a) corresponds to a predetermined angle δ2. The angle δ2 is determined such that the most trailing end 32e (33e) is aligned with the trailing end of the bar of the fourth tooth 38a when the most forwarding portion 32d (33d) is aligned with the circumferential center of the first tooth 38a. The angle δ2 is represented by the following equations with the angle θ.

$$\delta2=\theta\times(n-1-(\tfrac{1}{2}))-t/2 =30°\times(5-1-(\tfrac{1}{2}))-t/2 =105°-t/2$$

In the equations, the sign n represents the number of the bars of teeth in one teeth group, and the sign t represents an angle that corresponds to the distance between the trailing end of the bar of a tooth 38a and the forwarding end of the bar of the adjacent tooth 38a. In this embodiment, when commutation of one of the coils 39 is started, the most trailing end 32e (33e) of the main portion 32a (33a) is relatively away from the circumferential center of the fifth tooth 38a. This reduces the cogging torque of the motor 31. Accordingly, the motor 31 operates smoothly with low noise.

In the embodiments of FIGS. 1 to 3, 7 and 8, the circumferential length of the main portion of each magnet may be modified to correspond to a predetermined angle δ3(δ3≠δ, δ2<δ3<δ1). This modification has the same advantages as the embodiments of FIGS. 1 to 3, 7 and 8.

Figure 9:
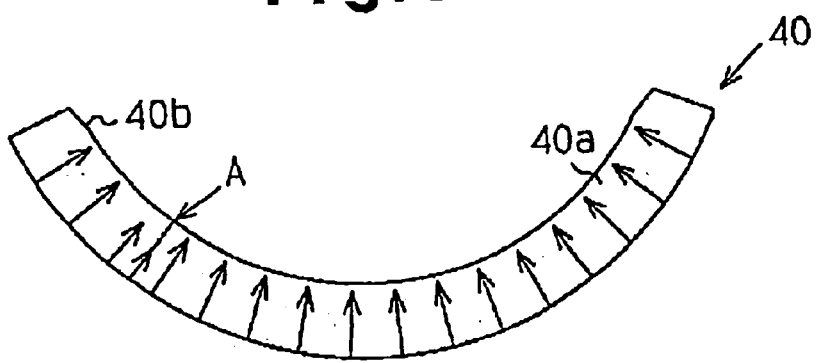
FIG. 9 is a diagrammatic view showing a magnet according to a modification of the embodiments of FIGS. 1 to 3, 7 and 8.
Figure 10:
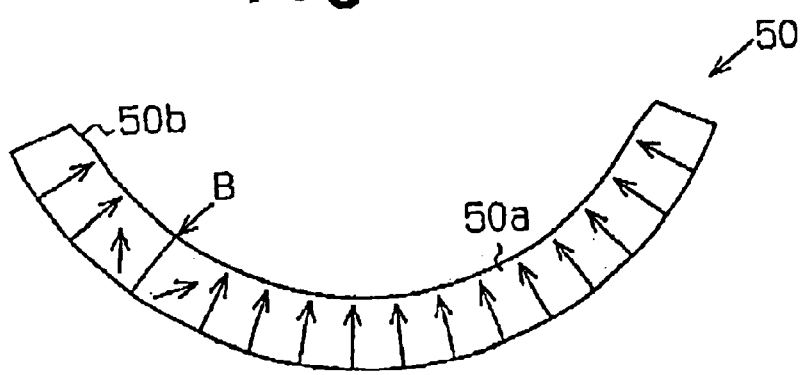
FIG. 10 is a diagrammatic view showing a magnet according to a first alternative modification of the embodiments of FIGS. 1 to 3, 7 and 8.
Figure 11:
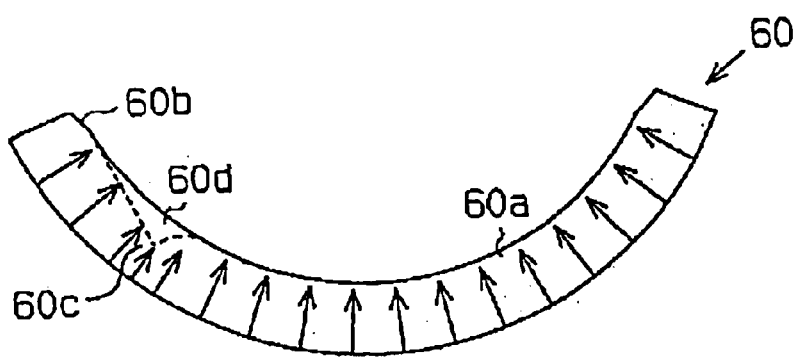
FIG. 11 is a diagrammatic view showing a magnet according to a second alternative modification of the embodiments of FIGS. 1 to 3, 7 and 8.

In the embodiments of FIGS. 1 to 3, 7 and 8, the extended portion of each magnet has changing thickness to increase the amount of magnetic flux passing through each coil. However, each magnet may have the structure shown in FIG. 9. The magnet 40 of FIG. 9 has a constant thickness, and the magnetic strength of the magnetic dipole is different at a border A. Further, a magnet 50 of an embodiment of FIG. 10 may be used. The thickness of the magnet 50 is constant. The orientation of the magnetic dipole of the magnet 50 is changed at a border B of the main portion 50a and the extended portion 50b. Alternatively, a magnet 60 of an embodiment of FIG. 11 may be used. The thickness of the magnet 60 is constant. A weak magnetic material 60d is embedded in a thin part 60c, which is located between the main portion 60a and the extended portion 60b. The embodiments of FIGS. 9 to 11 have the same advantages as the embodiments of FIGS. 1 to 3, 7 and 8.

Figure 12:
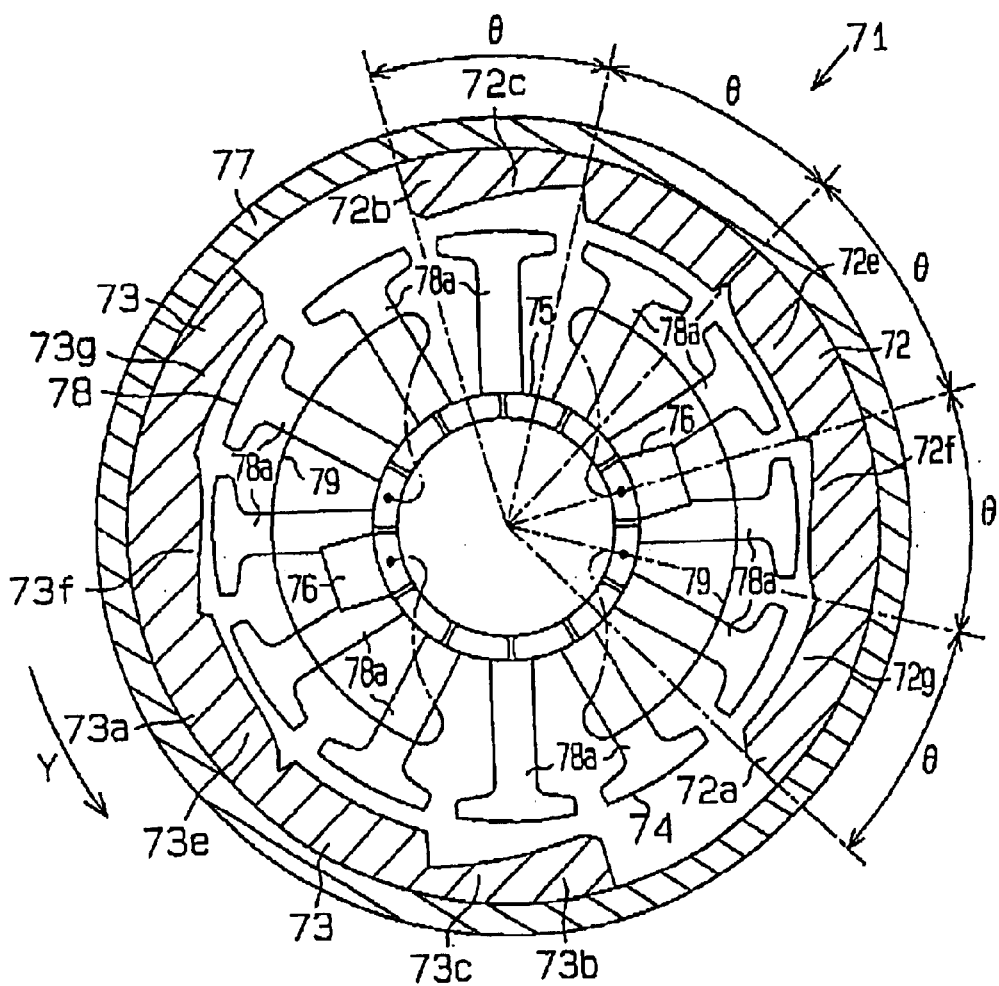
FIG. 12 is a partial cross-sectional view illustrating a direct-current motor according to a modification of the embodiment of the motor shown in FIG. 4.

The embodiment of FIGS. 4 to 6 may be modified as illustrated in FIG. 12. In the embodiment of FIG. 12, the main portion 72a (73a) of each magnet 72 (73) has three thin parts 72e, 72f, 72g (73e, 73f, 73g) that form the second weak flux part. The thin part 72e (73e) is spaced from the first thin part 72c (73c) by 30° θ. The thin part 72f (73f) is spaced from the first thin part 72c (73c) by 60° (2θ). The thin part 72g (73g) is spaced from the first thin part 72c (73c) by 90°0 (3θ). The thin parts 72e, 72f, 72g (73e, 73f, 73g) are formed by cutting the inner surface of the main portions 72a, 73a such that the change of thickness is opposite from that of the first thin part 72c (72d). The volume of the material removed from the main portion 72a, 73a for forming the thin part 72e, 72f, 72g (73e, 73f, 73g) is equal to the volume of the material removed from the main portion 72a, 73a for forming the first thin part 72c, 73c, which function as the first weak flux part. In this case, the cogging torque generated by the thin parts 72e, 73e, 72f, 73f, 72g, and 73g is equal to the cogging torque generated by the first thin part 72c, 73c. The direction of generation of the cogging torques are opposite in a rotation angle range.

As a result, the embodiment of FIG. 12 has the same advantages as the embodiment of FIGS. 4 to 6. Also, each of the thin parts 72e, 72f, 72g (73e, 73f, 73g) is formed by forming a recess that is shallower than that forming the first thin part 72c, 73c. This improves the rigidity of the magnets 72, 73.

One of the thin parts 72e (73e), 72f (73f), and 72g (73g) may be omitted. In this case, the remaining thin parts are formed to generate the same cogging torque as that generated by the first thin part 72c (73c).

As shown by single-dotted line A3 in FIG. 6, the change of the racing torque T (cogging torque) generated by the second thin part 12d (13d) of the embodiment shown in FIGS. 4 to 6 may be smaller than the cogging torque generated by the first thin part 12c (13c). Similarly, as shown by line A3, the change of the racing torque T (cogging torque) generated by the thin parts 72e, 72f, 72g (73e, 73f, 73g) of the embodiment shown in FIG. 12 may be smaller than the cogging torque generated by the first thin part 72c (73c). In these cases, the total cogging torque applied to the motor is not eliminated. However, the cogging torque is reduced.

In the embodiment of FIGS. 4 to 6, the second thin part 12d (13d) is formed in the main portion 12a (3a) and is separated from the first thin part 12c (13c) by the predetermined angle 2θ(m=2). However, the second thin part 12d (13d) may be separated from the first thin part 12c (13c) by the angle θ(m=1) or by the angle 3θ(m=3).

In the embodiments of FIGS. 4 to 6, and 12, the second weak flux part of the magnet 12 (72) and the second weak flux part of the magnet 13 (73) are spaced from the corresponding first weak flux part by the same angle. However, the second weak flux part of the magnet 12 (72) and the second weak flux part of the magnet 13 (73) may be spaced from the corresponding first weak flux part by different angles.

In the embodiments of FIGS. 4 to 6, and 12, the magnets 12 (72), 13 (73) may be replaced by magnets having a constant thickness. In this case, the first and second weak flux parts are formed by varying the magnetic property of the magnetic dipole or the direction of the magnetic dipoles. Alternatively, to make the thickness of the magnets 12 (72), 13 (73) uniform, weak magnetic material may be embedded in the recesses forming the first and second weak magnetic parts. These modified embodiments have substantially the same advantages as the embodiments of FIGS. 4 to 6, and 12.

In the embodiments of FIGS. 4 to 6, and 12 the main portion 12a (72a), 13a (73a) corresponds to the slot angle θ multiplied by an integer (4θ=120°). However, the main portion 12a (72a), 13a (73a) may correspond to the slot angle θ multiplied by (n−1−(½)). The sign n represents the number of teeth in a teeth group. For example, if the n is five and the angle θ is thirty degrees, the main portion 12a (72a), 13a (73a) corresponds to the 30° multiplied by (5−1−(½)= 3.5), or 105°. This modified embodiment reduces the cogging torque generated in each thin part.

The main portion 12a (72a), 13a (73a) may correspond to the slot angle θ multiplied by (n−1−(½)+t/2). The sign n represents the number of the teeth in a teeth group, and the sign t represents the angle defined by the trailing end of the bar of a tooth and the advancing end of the bar of the subsequent tooth.

Figure 13A:
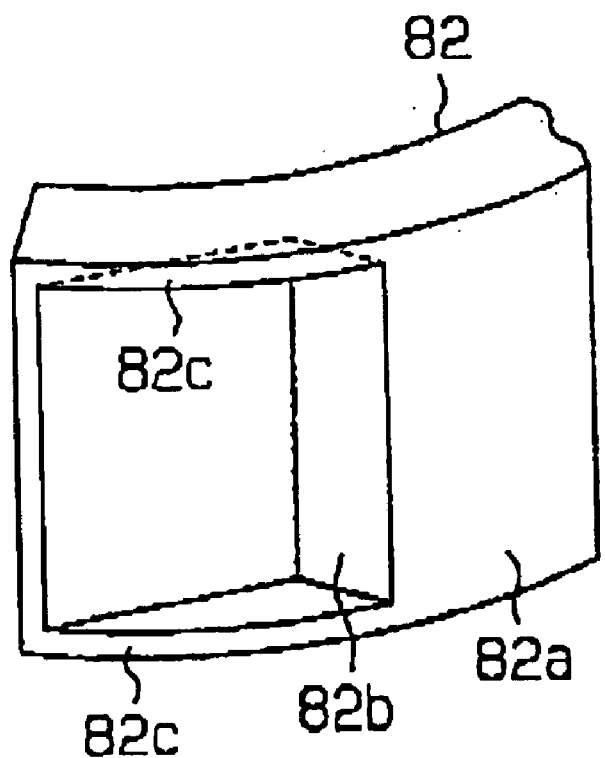
FIG. 13(a) is a partial perspective view illustrating a magnet according to a modified embodiment of the present invention.
Figure 13B:
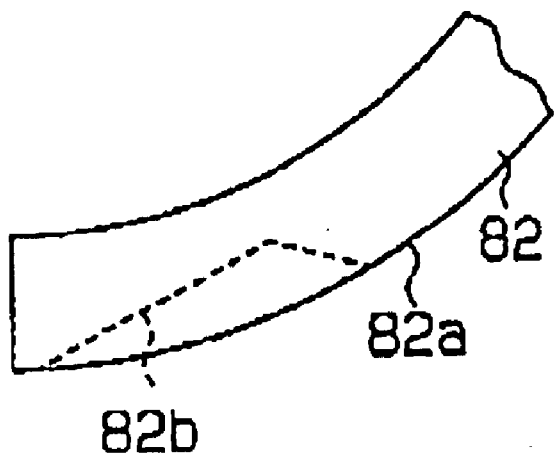
FIG. 13(b) is a partial plan view illustrating the magnet shown in FIG. 13(a).

In the above embodiments, recesses are formed in the inner side of each magnet to form a weak flux part. Weak flux parts may be formed by removing part of the magnet from the outer surface. For example, in an embodiment of FIGS. 13(a) and 13(b), a recess 82b is formed in the outer surface 82a of an arcuate magnet 82. When forming the recess 82b, or the weak flux part, to the magnet 82, the outer surface 82a is machined. Therefore, the operation range of a cutting tool is not limited and the machining is facilitated. Also, since the sidewalls 82c of the magnet 82 remain, the strength of the part corresponding to the thin part is increased.

The number of teeth may be more than or less than twelve. The number of the teeth in one teeth group may be more than or less than five.

The present invention may be applied to a motor other than a blower motor.

Therefore, the present examples and embodiments are to be considered as illustrative and not restrictive and the invention is not to be limited to the details given herein, but may be modified within the scope and equivalence of the appended claims.

What is claimed is:

1. An direct-current motor, comprising:
   an armature core, wherein the core has a plurality of teeth, the teeth being arranged at a pitch of a first predetermined angle;
   a plurality of armature coils, wherein each coil is wound about a different group of teeth having a predetermined number of teeth, wherein each tooth is located at the most forwarding position in the rotation direction in one of the teeth groups, and wherein the armature core and the armature coils form an armature;
   a plurality of magnets, wherein the magnets face one another with the armature in between, wherein each magnet includes:
      a main portion;
      an extended portion extending from the main portion;
   a first weak flux part, which is located in the vicinity of the border of the extended portion and the main portion, wherein the first weak flux part extends along one pitch of the teeth, and the flux of the first weak flux part gradually increases along the rotation direction of the armature;
   a commutator, which has a plurality of segments, wherein the segments are connected to each coil;
   a pair of brushes, which can contact each segment, wherein the brushes supply current to the coils through the segments, wherein, during commutation, each brush establishes a short circuit in an adjacent pair of the commutator segments, thereby changing the direction of current flowing through the coil; and
   wherein, when commutation is started for a group of teeth, the forwarding end of the first tooth in that teeth group, the first tooth being located at the most forwarding position in the group in the rotation direction of the armature, is aligned with the first weak flux part of one of the magnets;
   wherein the number of teeth belonging to the same group is represented by n, wherein the circumferential length of the main portion of each magnet corresponds to a second predetermined angle, wherein the second predetermined angle is determined such that, when the circumferential center of the first tooth is aligned with the most forwarding portion of the main portion in the rotation direction of the armature, the most trailing end of the main portion in the rotation direction of the armature is circumferentially located between the nth tooth and the (n−1)th tooth.

2. A direct-current motor, comprising;
   an armature core, wherein the core has a plurality of teeth, the teeth being arranged at a pitch of a first predetermined angle;
   a plurality of armature coils, wherein each coil is wound about a different group of teeth having a predetermined number of teeth, wherein each tooth is located at the most forwarding position in the rotation direction in one of the teeth groups, and wherein the armature core and the armature coils form an armature;
   a plurality of magnets, wherein the magnets face one another with the armature in between, wherein each magnet includes:
      a main portion;
      an extended portion extending from the main portion;
   a first weak flux part, which is located in the vicinity of the border of the extended portion and the main portion, wherein the first weak flux part extends along one pitch of the teeth, and the flux of the first weak flux part gradually increases along the rotation direction of the armature;
   a commutator, which has a plurality of segments, wherein the segments are connected to each coil;
   a pair of brushes, which can contact each segment, wherein the brushes supply current to the coils through the segments, wherein, during commutation, each brush establishes a short circuit in an adjacent pair of the commutator segments, thereby changing the direction of current flowing through the coil; and
   wherein, when commutation is started for a group of teeth, the forwarding end of the first tooth in that teeth group, the first tooth being located at the most forwarding position in the group in the rotation direction of the armature, is aligned with the first weak flux part of one of the magnet;
   wherein the main portion of each magnet includes a second weak flux part, wherein the second weak flux part is spaced from the first weak flux part by an angle that corresponds to the first predetermined angle multiplied by an integer, and wherein the flux of the second weak flux part increases in a direction opposite to the rotation direction of the armature.

3. The direct-current motor according to claim 2, wherein the second weak flux part comprises a plurality of second weak flux parts, and wherein the second weak flux parts are located in the main portion of each magnet.

4. The direct-current motor according to claim 2, wherein the first weak flux part and the second weak flux part are formed by removing part of the inner surface of the main portion of each magnet.

5. The direct-current motor according to claim 4, wherein the volume of part removed for forming the second weak flux part is equal to the volume of part removed for forming the first weak flux part.

6. The direct-current motor according to claim 1, wherein the number of teeth belonging to the same group is represented by n, wherein the circumferential length of the main portion of each magnet corresponds to a second predetermined angle, wherein the second predetermined angle is determined such that, when the circumferential center of the first tooth is aligned with the most forwarding portion of the main portion in the rotation direction of the armature, the most trailing end of the main portion in the rotation direction of the armature is aligned with the forwarding end of the nth tooth in the rotation direction of the armature.

7. The direct-current motor according to claim 1, wherein the number of teeth belonging to the same group is represented by n, wherein the circumferential length of the main portion of each magnet corresponds to a second predetermined angle, wherein the second predetermined angle is determined such that, when the circumferential center of the first tooth is aligned with the most forwarding portion of the main portion in the rotation direction of the armature, the most trailing end of the main portion in the rotation direction of the armature is aligned with the trailing end of the (n−1)th tooth in the rotation direction of the armature.

8. The direct-current motor according to claim 1, wherein the pitch of the segments is equal to the pitch of the teeth, and wherein an angle that corresponds to the contacting width between each brush and each segment is equal to the pitch of the teeth.

9. The direct-current motor according to claim 1, wherein the number of the magnets is two, and wherein the magnets are symmetric with respect to the axis of the armature.

10. The direct-current motor according to claim 1, wherein the first weak flux part is formed by removing part of the outer surface of the main portion of each magnet.

11. A direct-current motor, comprising:
an armature core, wherein the core has a plurality of teeth, the teeth being arranged at a pitch of a first predetermined angle;
a plurality of armature coils, wherein each coil is wound about a different group of teeth having a predetermined number of teeth, wherein each tooth is located at the most forwarding position in the rotation direction in one of the teeth groups, and wherein the armature core and the armature coils form an armature;
a pair of magnets, wherein the magnets face each other with the armature in between, wherein each magnet includes:
a main portion, wherein the circumferential length of the main portion corresponds to a second predetermined angle, wherein the number of teeth belonging to the same group is represented by n, and wherein, when the circumferential center of the first tooth in the group is aligned with the most forwarding portion of the main portion in the rotation direction of the armature, the most trailing end of the main portion in the rotation direction of the armature is circumferentially located between the nth tooth and the (n−1)th tooth;
an extended portion extending from the main portion;
a first weak flux part, which is located in the vicinity of the border of the extended portion and the main portion, wherein the first weak flux part extends along one pitch of the teeth, and the flux of the first weak flux part gradually increases alone the rotation direction of the armature;
a commutator, which has a plurality of segments, wherein the segments are connected to each coil;
a pair of brushes, which can contact each segment, wherein the brushes supply current to the coils through the segments, wherein, during commutation, each brush establishes a short circuit in an adjacent pair of the commutator segments, thereby changing the direction of current flowing through the coil; and
wherein, when commutation is started for a group of teeth, the forwarding end of the first tooth in that teeth group is aligned with the first weak flux part of one of the magnets;
wherein the main portion of each magnet includes a second weak flux part, wherein the second weak flux part is spaced from the first weak flux part by an angle that corresponds to the first predetermined angle multiplied by an integer, and wherein the flux of the second weak flux part increases in a direction opposite to the rotation direction of the armature.

12. The direct-current motor according to claim 11, wherein the second weak flux part comprises a plurality of second weak flux parts, and wherein the second weak flux parts are located in the main portion of each magnet.

13. The direct-current motor according to claim 12, wherein the first weak flux part and the second weak flux part are formed by removing part of the inner surface of the main portion of each magnet.

14. The direct-current motor according to claim 11, wherein the pitch of the segments is equal to the pitch of the teeth, and wherein an angle that corresponds to the contacting width between each brush and each segment is equal to the pitch of the teeth.

* * * * *

UNITED STATES PATENT AND TRADEMARK OFFICE
CERTIFICATE OF CORRECTION

PATENT NO. : 6,720,697 B2
DATED : April 13, 2004
INVENTOR(S) : Hiroyuki Harada et al.

It is certified that error appears in the above-identified patent and that said Letters Patent is hereby corrected as shown below:

Column 1,
Line 44, delete "An", and insert therefor -- A --.

Column 14,
Line 21, delete "alone", and insert therefor -- along --.

Signed and Sealed this

Twenty-third Day of November, 2004

JON W. DUDAS
*Director of the United States Patent and Trademark Office*